United States Patent
Hussain et al.

(10) Patent No.: US 10,610,051 B2
(45) Date of Patent: Apr. 7, 2020

(54) GRILL WITH A SPLIT LID

(71) Applicants: Shiek Abdel Taahyr Hussain, Palm Bay, FL (US); Shareed Hussain, Palm Bay, FL (US)

(72) Inventors: Shiek Abdel Taahyr Hussain, Palm Bay, FL (US); Shareed Hussain, Palm Bay, FL (US)

(*) Notice: Subject to any disclaimer, the term of this patent is extended or adjusted under 35 U.S.C. 154(b) by 23 days.

(21) Appl. No.: 16/103,639

(22) Filed: Aug. 14, 2018

(65) Prior Publication Data

US 2019/0191928 A1 Jun. 27, 2019

Related U.S. Application Data

(60) Provisional application No. 62/610,513, filed on Dec. 27, 2017.

(51) Int. Cl.
*F24B 1/192* (2006.01)
*A47J 37/07* (2006.01)

(52) U.S. Cl.
CPC ........ *A47J 37/0704* (2013.01); *A47J 37/0763* (2013.01); *F24B 1/192* (2013.01)

(58) Field of Classification Search
CPC ................ A47J 37/0704; A47J 37/0763
USPC ............................... 74/434, 437, 439, 457
See application file for complete search history.

(56) References Cited

U.S. PATENT DOCUMENTS

| | | | | |
|---|---|---|---|---|
| 6,357,322 B1* | 3/2002 | Dolan | ............ | B67B 7/0447 81/3.29 |
| 8,196,487 B2* | 6/2012 | Bless | ............ | B62D 3/12 74/422 |
| 2003/0019492 A1* | 1/2003 | Williams | ............ | A47J 37/0704 126/41 R |
| 2006/0272630 A1* | 12/2006 | Sanders | ............ | A47J 33/00 126/9 R |
| 2010/0083947 A1* | 4/2010 | Guillory | ............ | A47J 37/0704 126/25 R |
| 2012/0247448 A1* | 10/2012 | Thibodeaux | ............ | A47J 37/07 126/25 R |
| 2013/0319256 A1* | 12/2013 | Piazzi | ............ | A47J 37/0704 99/341 |
| 2016/0100714 A1* | 4/2016 | Dokhanian | ............ | F24B 1/202 126/25 R |
| 2017/0105573 A1* | 4/2017 | Atkisson | ............ | A47J 37/07 |

* cited by examiner

*Primary Examiner* — Grant Moubry
*Assistant Examiner* — Rabeeul I Zuberi (57) ABSTRACT

A grill with a split lid that allows the user to safely and efficiently manage cooking food items. The grill includes a housing body, a first split lid, a second split lid, a grill tray, a charcoal tray, and a support-structure assembly. The first split lid and the second split lid cover and provide access to the housing body. The split lid and the second split lid are positioned opposite to each other, across a main opening of the housing body. The first split lid is laterally and hingedly connected to a first lateral sidewall of the housing body. Similarly, the second split lid is laterally and hingedly connected to a second lateral sidewall of the housing body. The support-structure assembly is adjacently mounted to the housing body, opposite the main opening. The grill tray and the charcoal tray are each laterally and slidably mounted into the housing body.

13 Claims, 6 Drawing Sheets

GRILL WITH A SPLIT LID

The current application claims a priority to the U.S. Provisional Patent application Ser. No. 62/610,513 filed on Dec. 27, 2017.

FIELD OF THE INVENTION

The present invention relates generally to cooking and barbecuing devices. More specifically, the present invention is a grill design which utilizes a split-lid configuration that prevents heat from hitting a user directly. Additionally, the present invention provides a means for safely and conveniently loading charcoal and food items.

BACKGROUND OF THE INVENTION

Traditional designs for grills commonly use a lid/cover that opens from the front to back. Resultantly, when a user opens the grill, the internal heat of the grill rushes directly at the user, specifically his or her face. This is uncomfortable and potentially dangerous. Additionally, this occurs quite often during the user of the grill as the user must open the lid to place food items, check food items, reposition food items, and to monitor/adjust the charcoal or other burning elements within the grill. The present invention provides an alternative lid design which overcomes the aforementioned problem. The present invention utilizes a lid which comprises two section that open sideways, not from front to back. Resultantly, when opened heat rises directly upwards. Additionally, the present invention integrates viewing windows into the two sections of the lid to allow the user to monitor food items being cooked without requiring the user to open the lid.

The present invention also includes a grill tray and a charcoal tray, similar to traditional designs, except each is implemented as a drawer type tray. The grill tray and the charcoal tray are implemented as a drawer type tray which slides in and out of a housing body of the grill. Resultantly, the user can easily access the grill tray and the charcoal tray without having to open the lid of the grill.

DETAIL DESCRIPTIONS OF THE INVENTION

All illustrations of the drawings are for the purpose of describing selected versions of the present invention and are not intended to limit the scope of the present invention.

The present invention generally relates to cooking devices and appliances. More specifically, the present invention is an alternative grill design that uses a dual-segmented lid that opens up sideways to prevent hot air from rising directly into user's face or body. Traditional grill designs use a lip or cover which opens up from front to back of the grill body, releasing and redirecting heat directly upwards and forwards of the grill body. This blows extremely hot air directly onto a user of the grill. Additionally, the present invention uses drawers to hold the rock grate and the cooking grid, thus allowing the user to easily manage charcoals within the present invention, load food items, and clean the internal components of the present invention.

Figure 1:
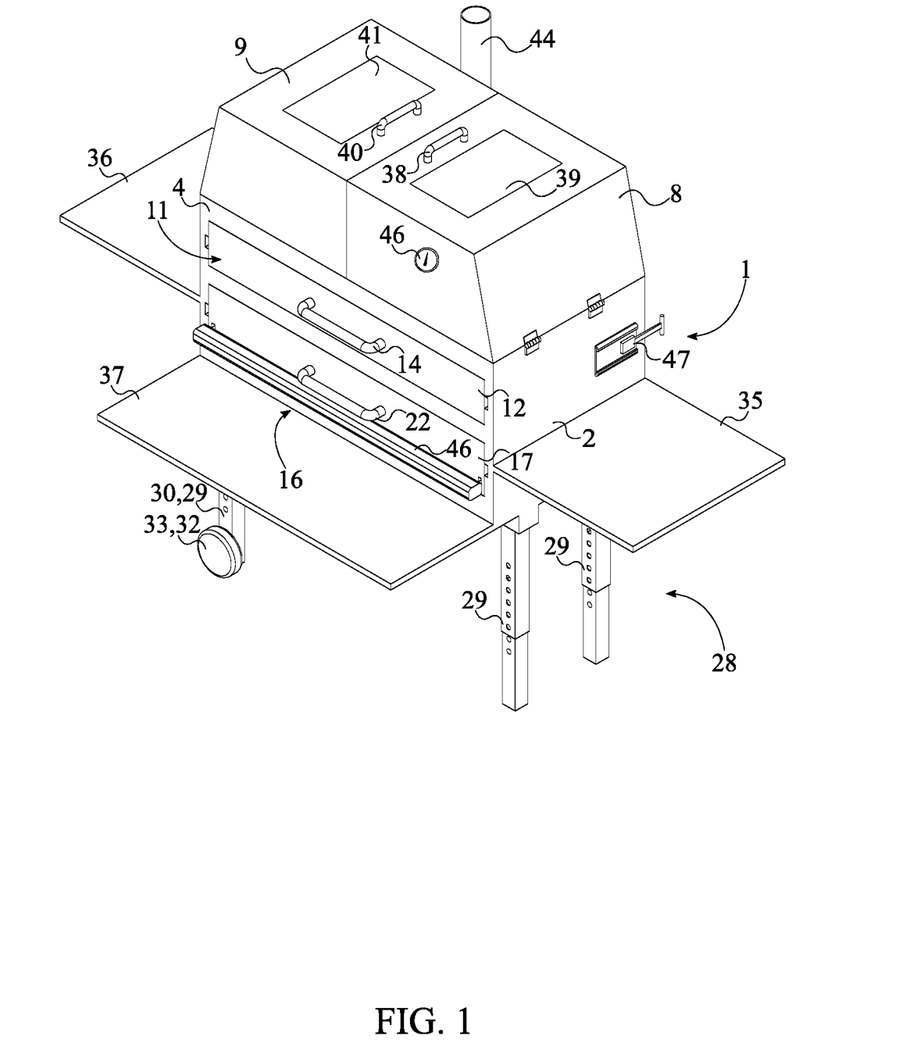
FIG. 1 is a perspective view of the present invention.

Referring to FIG. 1, the present invention comprises a housing body 1, a first split lid 8, a second split lid 9, an at least one grill tray 11, a charcoal tray 16, and a support-structure assembly 28. The housing body 1 supports and contains the heating elements of the present invention and, in particular, the grill tray 11 and the charcoal tray 16. In general, the housing body 1 is an open shell-like structure. In the simplest embodiment of the present invention, the housing body 1 is a box-shaped structure that comprises a first lateral sidewall 2, a second lateral sidewall 3, a front sidewall 4, a rear sidewall 5, a bottom sidewall 6, and a main opening 7. The first lateral sidewall 2 and the second lateral sidewall 3 are mounted parallel and offset to each other, across the main opening 7. Similarly, the front sidewall 4 and the rear sidewall 5 are mounted parallel and offset to each other. Additionally, the front sidewall 4 and the rear sidewall 5 are perpendicularly connected in between the first lateral sidewall 2 and the second lateral sidewall 3. Resultantly, this creates a perimetrical frame. The perimetrical frame is closed off on one end by the bottom sidewall 6. In particular, the bottom sidewall 6 is positioned in between the first lateral sidewall 2, the second lateral sidewall 3, the front sidewall 4, and the rear sidewall 5. To create the floor of the housing body 1, the bottom sidewall 6 is perimetrically and terminally connected to the first lateral sidewall 2, the second lateral sidewall 3, the front sidewall 4, and the rear sidewall 5. This yields a box with a recessed space. The first split lid 8 and the second split lid 9 are each half of a full cover that is used to close off the main opening 7 of the housing body 1. As such, the first split lid 8 and the second split lid 9 are positioned opposite to each other, across the main opening 7. The first split lid 8 is laterally and hingedly connected to the first lateral sidewall 2. More specifically, the first split lid 8 is terminally and hingedly mounted to the first lateral sidewall 2 about a first rotation axis 42. Mirroring the first split lid 8, the second split lid 9 is laterally and hingedly connected to the second lateral sidewall 3. In particular, the second split lid 9 is terminally and hingedly mounted to the second lateral sidewall 3 about a second rotation axis 43. Resultantly, the first rotation axis 42 and the second rotation axis 43 are positioned parallel and offset to each other about the main opening 7. This orients the first split lid 8 and the second split lid 9 towards each other. When the first split lid 8 and the second split lid 9 are positioned in the open configuration, the first split lid 8 rotates outwards towards the first lateral sidewall 2 and the second split lid 9 rotates outwards towards the second lateral sidewall 3.

Figure 4:
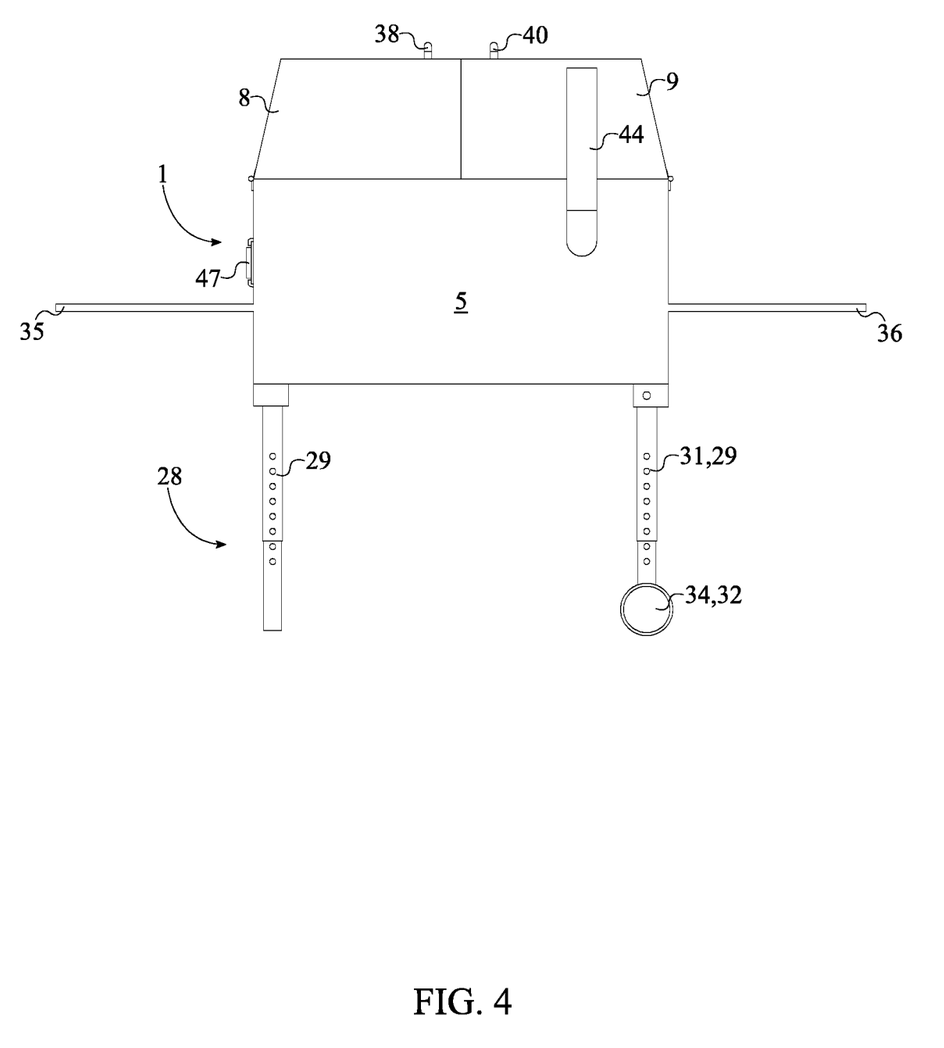
FIG. 4 is a rear-elevation view of the present invention.

The support-structure assembly 28 includes a set of support legs and associated mechanisms used for stability, mobility, and storage. Referring to FIG. 4, the support-structure assembly 28 is positioned adjacent to the housing body 1, opposite to the main opening 7. Additionally, the support-structure assembly 28 is adjacently mounted to the housing body 1, i.e. the bottom sidewall 6.

The charcoal tray 16 holds charcoals and or other substances used to produce heat for grilling and cooking purposes. As such, since heat rises, the charcoal tray 16 is positioned lowest within the housing body 1, i.e. adjacent to the support-structure assembly 28. The grill tray 11 supports and holds food items to be cooked or heated by the present invention. The grill tray 11 is positioned adjacent to the charcoal tray 16, opposite to the support-structure assembly 28. In particular, the grill tray 11 is positioned directly above the charcoal tray 16 such that heat rises directly under the grill tray 11, similar to traditional designs. Unlike traditional designs, the charcoal tray 16 and the grill tray 11 are implemented in a drawer-style configuration which allows the user to access either the charcoal tray 16 or the grill tray 11 with easy and safety. More specifically, the charcoal tray 16 and the grill tray 11 are each laterally and slidably mounted into the housing body 1, similar to a dresser.

Figure 2:
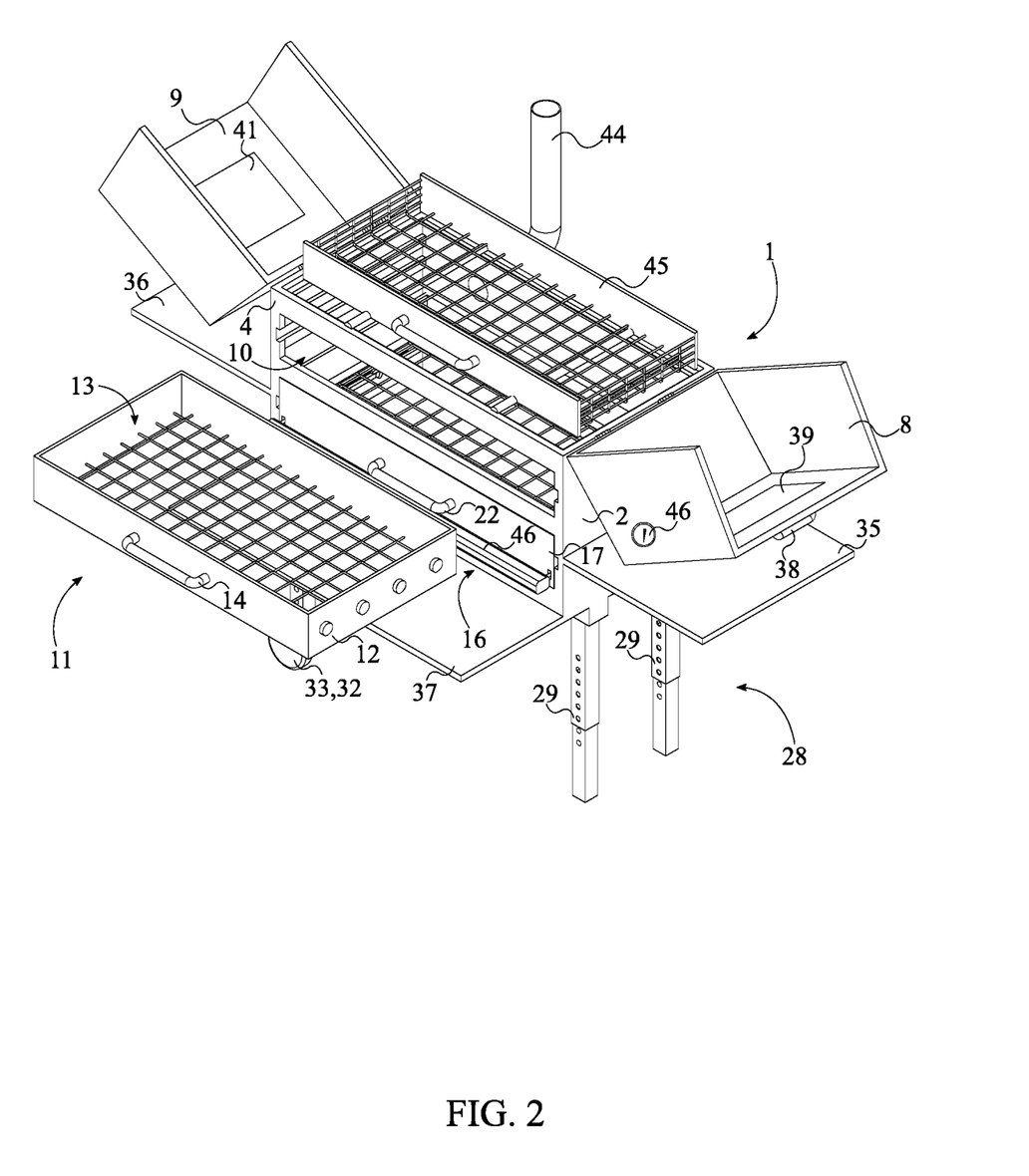
FIG. 2 is a perspective view of the present invention in a partially exploded view.

Referring to FIG. 2, for the grill tray 11, the present invention further comprises a grill-receiving hole 10, wherein the grill tray 11 comprises a grill box frame 12, a grill grate 13, and a first handle 14. The grill-receiving hole 10 normally traverses through the front sidewall 4 and is sized to receive the grill tray 11 fully. More specifically, the grill-receiving hole 10 is sized to receive the grill box frame 12. The grill box frame 12 is the support structure for the grill grate 13. The grill box frame 12 is a box-like structure without a top and a bottom. The grill box frame 12 is positioned within the grill-receiving hole 10. Additionally, the grill box frame 12 is slidably mounted to the housing body 1 within the grill-receiving hole 10. The grill box frame 12 may be slidably mounted to the housing body 1 through a variety of means including, not limited to, sliding rails, telescoping slides, drawer slides, and rail-and-bearings mechanisms to name a few non-limiting examples. The grill grate 13 is a mesh comprising a multitude of rods that perpendicularly intersect with each other to create a barrier that allows small objects, water, and heat to pass through while supporting larger objects such as food items. The grill grate 13 is preferably composed of metal and is sized complimentary to the internal space of the grill box frame 12. In particular, the grill grate 13 is perimetrically mounted within the grill box frame 12. The first handle 14 acts as a grasping element for the grill box frame 12 to allow the user to move the grill tray 11 in and out of the housing body 1. The first handle 14 is externally positioned to the housing body 1 and is externally and adjacently mounted to the grill box frame 12.

Figure 3:
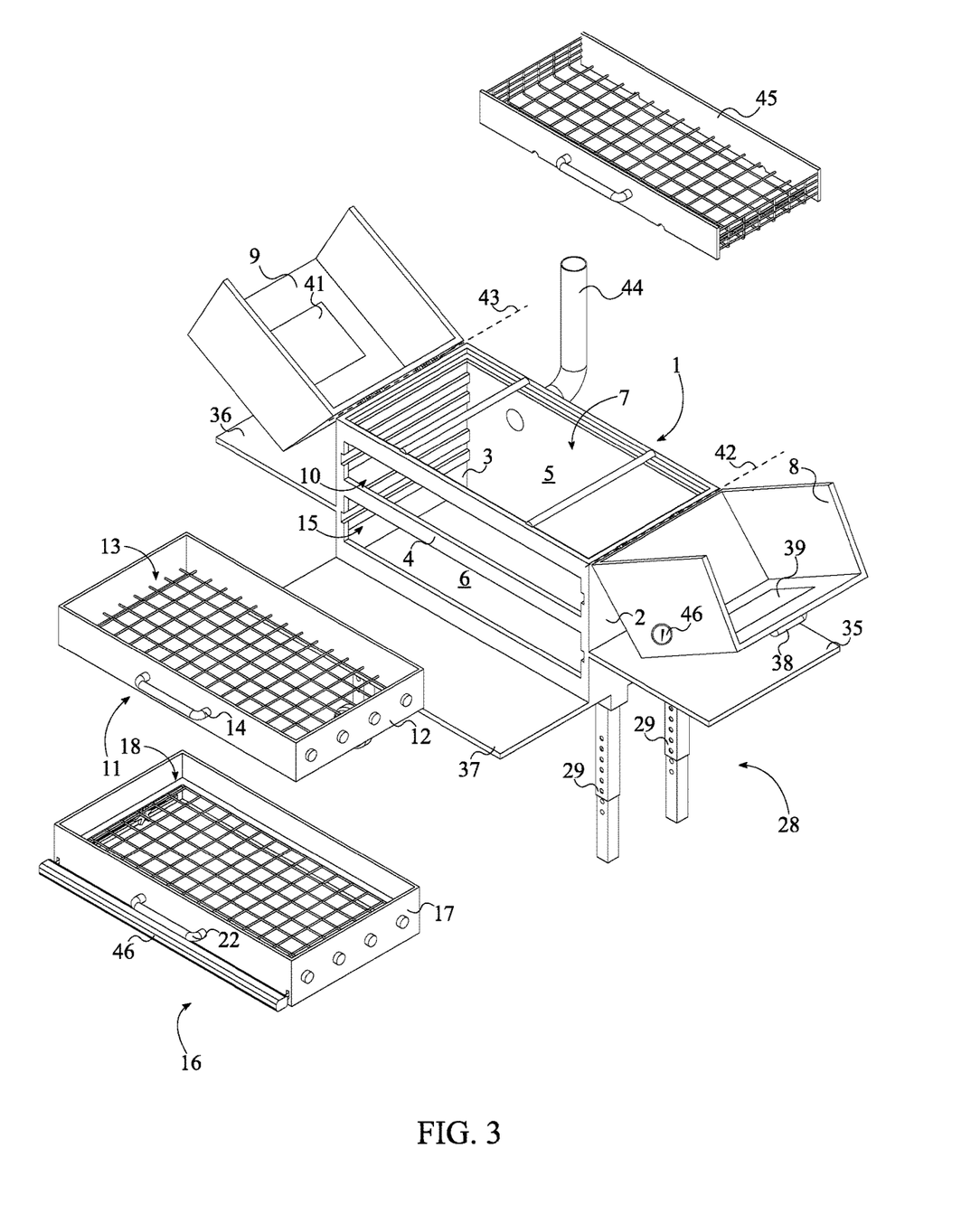
FIG. 3 is a perspective view of the present invention in an exploded view.
Figure 5:
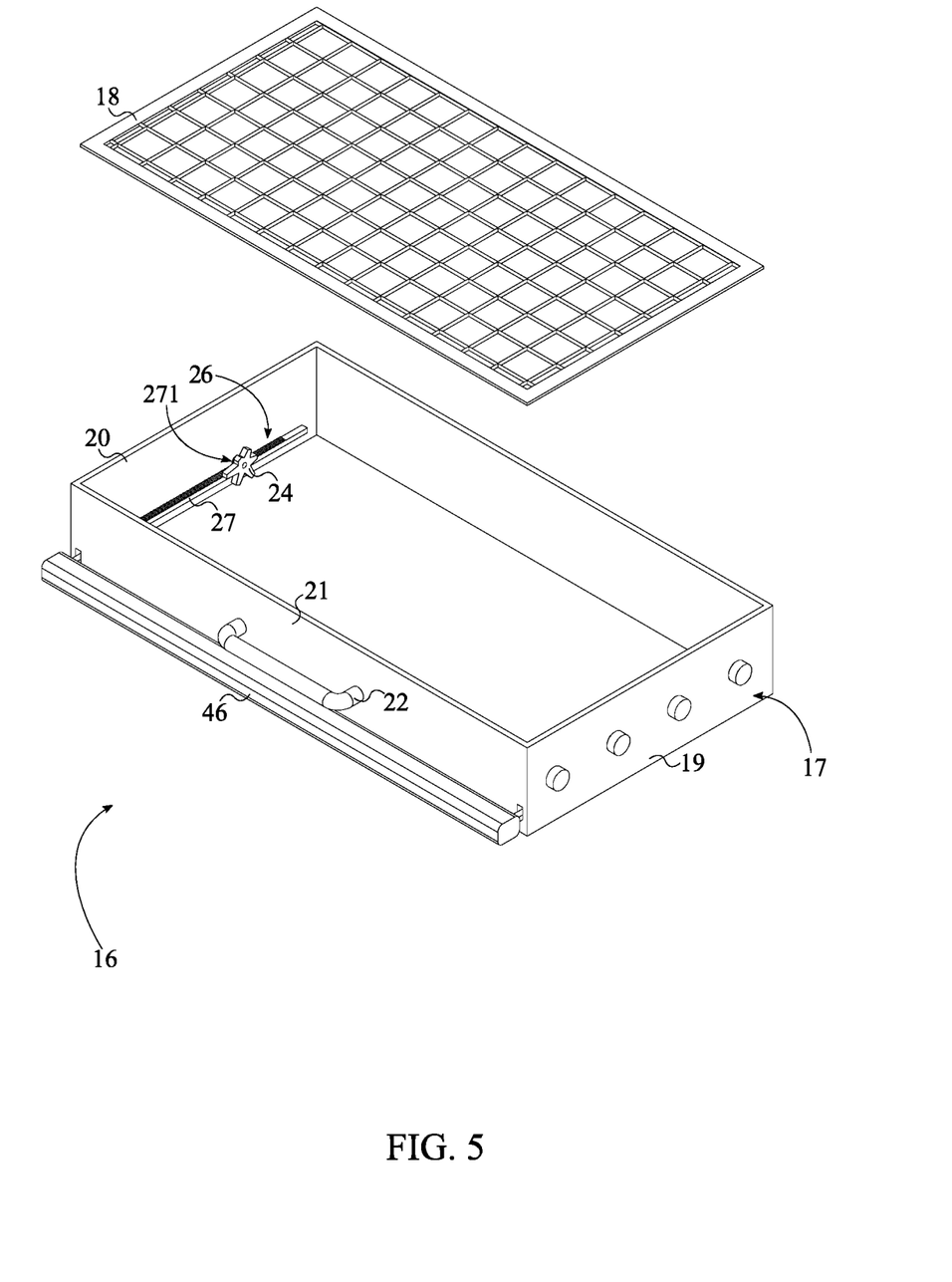
FIG. 5 is a perspective view of a charcoal tray of the present invention in the exploded view.
Figure 6:
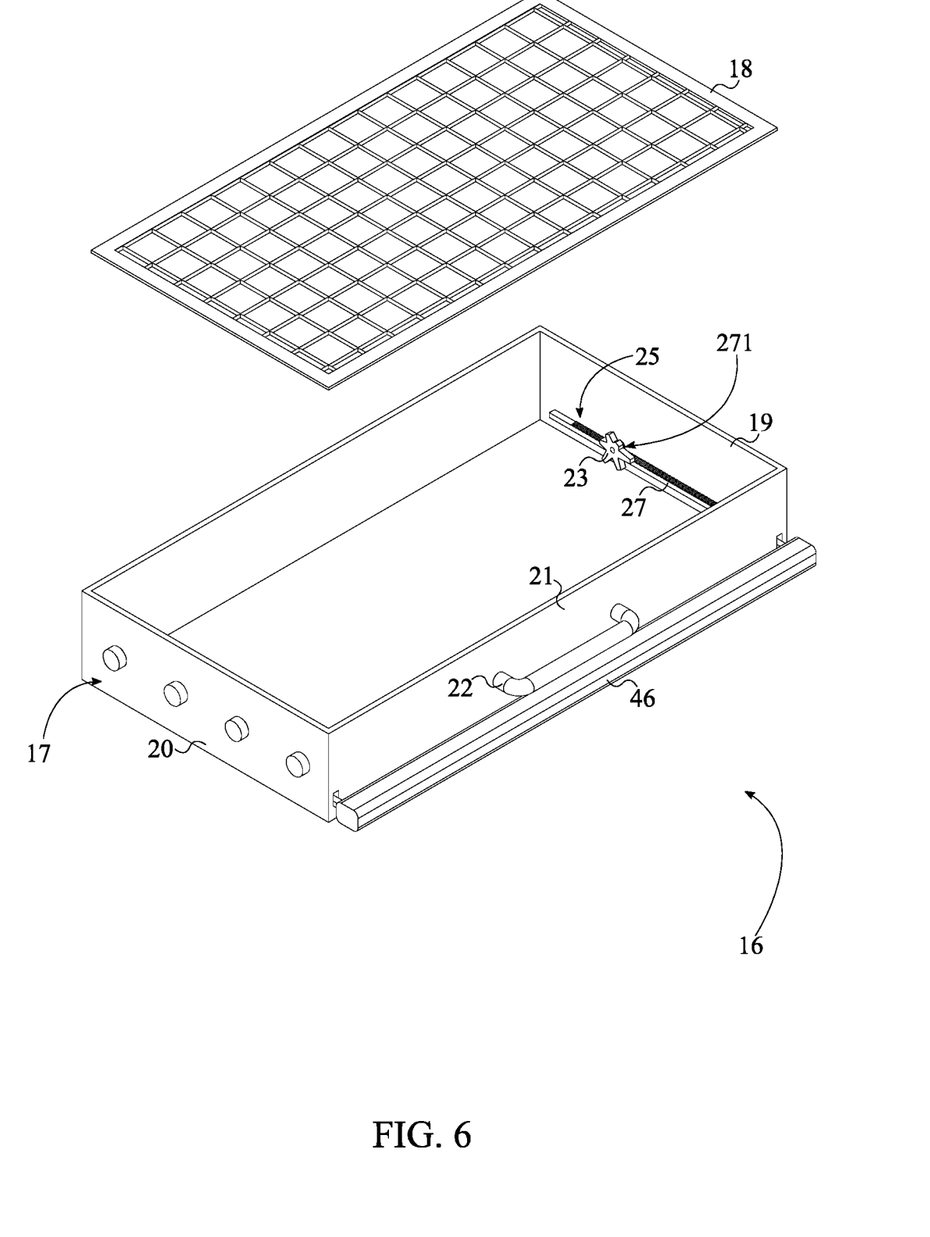
FIG. 6 is an alternative perspective view of the charcoal tray in the exploded view.

Referring to FIG. 3, FIG. 5, and FIG. 6, for the charcoal tray 16, the present invention further comprises a charcoal-receiving hole 15 and the charcoal tray 16 comprises a charcoal box frame 17, a charcoal grate 18, and a second handle 22. The charcoal-receiving hole 15 normally traverses through the front sidewall 4 and is sized to receive the charcoal box frame 17. The charcoal box frame 17 is the support structure for the charcoal grate 18. Similar to the grill box frame 12, the charcoal box frame 17 is a box-like structure without a top and a bottom. The charcoal box frame 17 is positioned within the charcoal-receiving hole 15. Additionally, the charcoal box frame 17 is slidably mounted to the housing body 1 within the charcoal-receiving hole 15. The charcoal box frame 17 may be slidably mounted to the housing body 1 through a variety of means including, not limited to, sliding rails, telescoping slides, drawer slides, and rail-and-bearings mechanisms to name a few non-limiting examples. The charcoal grate 18 is a mesh comprising a multitude of rods that perpendicularly intersect with each other to create a barrier that allows small objects, water, and heat to pass through while supporting larger objects such as charcoal and other similar heat sources. The charcoal grate 18 is preferably composed of metal and is sized complimentary to the internal space of the charcoal box frame 17. In particular, the charcoal grate 18 is perimetrically mounted within the charcoal box frame 17. The second handle 22 acts as the grasping element for the charcoal box frame 17 to allow the user to move the charcoal box frame 17 in and out of the housing body 1. Thus, the second handle 22 is externally positioned to the housing body 1 and is externally and adjacently mounted to the charcoal box frame 17.

In one embodiment, the present invention further allows the user to vary the cooking temperature for food items on the grill grate 13 by positioning the charcoal grate 18 closer or further to the grill tray 11. For this, the present invention further comprises an at least one first asymmetric gear 23, an at least one second asymmetric gear 24, a first rack-and-pinion mechanism 25, a second rack-and-pinion mechanism 26, and an adjustment handle 46. The first asymmetric gear 23 and the second asymmetric gear 24 support, raise, and lower the charcoal grill. The first rack-and-pinion mechanism 25 and the second rack-and-pinion mechanism 26 rotate the first asymmetric gear 23 and the second asymmetric gear 24 in order to raise or lower the charcoal grill. Referring to FIG. 5 and FIG. 6, the first asymmetric gear 23 and the second asymmetric gear 24 are each a spur-type gear with a plurality of teeth, wherein each from the plurality of teeth is a different sized tooth. Resultantly, each of the plurality of teeth has a different radial distance from a rotation center. The first asymmetric gear 23 and the second asymmetric gear 24 are positioned within the charcoal box frame 17 and are positioned opposite to each other, across the charcoal box frame 17. The first asymmetric gear 23 is rotatably mounted to a third lateral sidewall 19 of the charcoal box frame 17; wherein the third lateral sidewall 19 is positioned parallel and adjacent to the first lateral sidewall 2. Similarly, the second asymmetric gear 24 is rotatably mounted to a fourth lateral sidewall 20 of the charcoal box frame 17; wherein the fourth lateral sidewall 20 is positioned parallel and adjacent to the second lateral sidewall 3. The charcoal grate 18 is positioned adjacent and onto the first asymmetric gear 23 and the second asymmetric gear 24. Resultantly, when the first asymmetric gear 23 and the second asymmetric gear 24 are rotated, the charcoal grate 18 will be supported by different teeth from the first asymmetric gear 23 and the second asymmetric gear 24. Because the teeth of the first asymmetric gear 23, and the teeth of the second asymmetric gear 24, are of different heights, the aforementioned rotation raises or lowers the charcoal grate 18. Raising or lowering the charcoal grate 18 positions the heating elements, i.e. charcoal, closer or further to the grill tray 11, hence increasing or decreasing the cooking temperature for food items held by the grill tray 11.

Rotation of the first asymmetric gear 23 and the second asymmetric gear 24 is achieved by the first rack-and-pinion mechanism 25, the second rack-and-pinion mechanism 26, respectively, and the adjustment handle 46. The first rack-and-pinion mechanism 25 is mechanically integrated in between the charcoal box frame 17 and the first asymmetric gear 23. Similarly, the second rack-and-pinion mechanism 26 is mechanically integrated in between the charcoal box frame 17 and the second asymmetric gear 24. For the first asymmetric gear 23, a spur gear 271 of the first rack-and-pinion mechanism 25 is concentrically and torsionally connected to the first asymmetric gear 23. A toothed bar 27 of the first rack-and-pinion mechanism 25 is mechanically engaged to the spur gear 271 of the first rack-and-pinion mechanism 25 in order to convert translation motion into rotational motion, and thus rotate the first asymmetric gear 23. Additionally, the toothed bar 27 of the first rack-and-pinion mechanism 25 normally traverses through a frontal sidewall 21 of the charcoal box. For the second asymmetric gear 24, a spur gear 271 of the second rack-and-pinion mechanism 26 is concentrically and torsionally connected to the second asymmetric gear 24. A toothed bar 27 of the second rack-and-pinion mechanism 26 is mechanically engaged to the spur gear 271 of the second rack-and-pinion mechanism 26 in order to convert translation motion into rotational motion, and thus rotate the second asymmetric gear 24. Additionally, the toothed bar 27 of the second rack-and-pinion mechanism 26 normally traverses through the frontal sidewall 21 of the charcoal box. The adjustment handle 46 actuates the first rack-and-pinion mechanism 25 and the second rack-and-pinion mechanism 26 simultaneously in order to raise or lower the charcoal grate 18 evenly. More specifically, the adjustment handle 46 is perpendicularly and terminally connected in between the toothed bar 27 of the first rack-and-pinion mechanism 25 and the toothed bar 27 of the second rack-and-pinion mechanism 26. Resultantly, the user may move the adjustment handle 46 towards and away from the frontal sidewall 21 of the charcoal box frame 17, and in doing so actuate the first rack-and-pinion mechanism 25 and the second rack-and-pinion mechanism 26 to raise or lower the charcoal grate 18.

In the preferred embodiment of the present invention, the at least one first asymmetric gear 23 comprises a plurality of first asymmetric gears, wherein the plurality of first asymmetric gears is linearly distributed along the third sidewall. Additionally, the first rack-and-pinion mechanism 25 is mechanically coupled to each within the plurality of first asymmetric gears. Similarly, the at least one second asymmetric gear 24 comprises a plurality of second asymmetric gears, wherein the plurality of second asymmetric gears is linearly distributed along the fourth sidewall. Additionally, the second rack-and-pinion mechanism 26 is mechanically coupled to each within the plurality of second asymmetric gears. This provides symmetrical support to the charcoal grate 18.

Referring to FIG. 2, the first split lid 8 and the second split lid 9 provide a means of safely opening the grilling portion, the heated portion, of the present invention. The present invention further comprises a first lid handle 38, a second lid handle 40, a first viewing window 39, and a second viewing window 41 in order to ensure the user has safe access to the grilling portion. The first lid handle 38 acts as the gripping element for the first split lid 8 to prevent accidental burns. In particular, the first lid handle 38 is positioned adjacent to the first split lid 8, opposite the housing body 1. Additionally, the first lid handle 38 is externally and adjacently connected to the first split lid 8 for easy and safe access to the user. Similarly, the second lid handle 40 acts as the gripping element for the second split lid 9 to prevent accidental burns. The second lid handle 40 is positioned adjacent to the second split lid 9, opposite the housing body 1. Additionally, the second lid handle 40 is externally and adjacently connected to the second split lid 9. The first lid handle 38 and the second lid handle 40 are each a U-shaped ridged structure sized to be comfortable grasped by a hand. Additionally, the first lid handle 38 and the second lid handle 40 are preferably composed of an insulated material such that the user is not burned during use. The first viewing window 39 and the second viewing window 41 are each a piece of transparent slab which allow the user to look through either the first split lid 8 or the second split lid 9 in order to physically see the cooking progress within the present invention without significantly reducing the internal temperature. The first viewing window 39 is integrated into the first split lid 8, adjacent to the first lid handle 38. Similarly, the second viewing window 41 is integrated into the second split lid 9, adjacent to the second lid handle 40.

Referring to FIG. 4, the present invention also provides the user with a multitude of shelf space for storage of food or cooking items. More specifically, the present invention comprises a first lateral shelf 35, a second lateral shelf 36, and a main shelf 37. The first lateral shelf 35 and the second lateral shelf 36 are each an elongated and rectangular plate that provide additional storage space to the sides of the housing body 1. The first lateral shelf 35 is positioned adjacent to the first lateral sidewall 2, opposite the main opening 7. Additionally, the first lateral shelf 35 is mounted perpendicular to the first lateral sidewall 2. Similarly, the second lateral shelf 36 is positioned adjacent to the second lateral sidewall 3, opposite the main opening 7. Additionally, the second lateral shelf 36 is mounted perpendicular to the second lateral sidewall 3. The first lateral shelf 35 and the second lateral shelf 36 provide storage space for holding cooking utensils, food items, and serve other similar grilling purposes. The main shelf 37 is an elongated rectangular plate that provides additional shelf space in the front portion of the housing body 1. More specifically, the main shelf 37 is positioned in between the support-structure assembly 28 and the charcoal tray 16. Additionally, the main shelf 37 is laterally and perpendicularly mounted to the front sidewall 4 as seen in FIG. 5. The length, width, thickness, material composition, and location of the first lateral shelf 35, the second lateral shelf 36, and the main shelf 37 is subject to change to meet the needs and preferences of the user. For example, the first lateral shelf 35, the second lateral shelf 36, and the main shelf 37 may be composed of wood, metal, or a combination of metal and durable wood. Additionally, in another embodiment, the first lateral shelf 35, the second lateral shelf 36, and the main shelf 37 may be hingedly mounted to the housing body 1 in order to allow for said components to collapse and reduce the overall storage needs of the present invention.

Similar to traditional designs, the present invention further comprises an exhaust chimney 44. The exhaust chimney 44 is an elongated tubular structure designed to expel gases produced by burning charcoal, i.e. smoke, before said gases reach food items being cooked by the present invention. The exhaust chimney 44 is positioned in between the first lateral sidewall 2 and the second lateral sidewall 3. Additionally, the exhaust chimney 44 traverses into the rear sidewall 5 such that the exhaust chimney 44 and the internal space of the housing body 1 are in fluid communication. The exhaust chimney 44 is preferably oriented upwards or away from the housing body 1 in some fashion. Additionally, the exhaust chimney 44 may also include a lid that allows the user to control the amount of smoke escaping the housing body 1. In the preferred embodiment of the present invention, the exhaust chimney 44 is perpendicularly connected to the rear sidewall 5 and includes a right-angle bend directly towards the first split lid 8 and the second split lid 9.

Referring to FIG. 2 and FIG. 4, the support-structure comprises a plurality of legs 29 and an at least one pair of wheels 32. The plurality of legs 29 raises the overall height of the present invention. The pair of wheels 32 allow the present invention to be transported and moved with ease. Each of the plurality of legs 29 is an elongated support structure that may be telescopic to allow for height adjustment. The plurality of legs 29 is distributed about the bottom sidewall 6 with each of the plurality of legs 29 being hingedly and terminally connected to the bottom sidewall 6. The hinge connection between each of the plurality of legs 29 and the bottom sidewall 6 allows the support-structure to be positioned into a collapsed configuration for storage or transportation purposes. The pair of wheels 32 are positioned adjacent to the plurality of legs 29, opposite the housing body 1. More specifically, a first wheel 33 from the pair of wheels 32 is rotatably mounted to a first leg 30 from the plurality of legs 29. Similarly, a second wheel 34 from the pair of wheels 32 is rotatably mounted to a second leg 31 from the plurality of legs 29. To allow for easy maneuverability, the first wheel 33 and the second wheel 34 are coaxially positioned with each other.

Referring to FIG. 2, the present invention further comprises a warm-up grill 45. The warm-up grill 45 sits furthest from the charcoal tray 16 and allows the user to warm up food items. In particular, the warm-up grill 45 is a mesh comprising a multitude of rods that perpendicularly intersect with each other to create a barrier that allows small objects, water, and heat to pass through while supporting larger objects such as food items. The grill grate 13 is preferably composed of metal and is sized complimentary to the main opening 7. In particular, the warm-up grill 45 is perimetrically positioned within the main opening 7. Additionally, the warm-up grill 45 is slidably mounted to the housing body 1. A handle may be attached to the warm-up grill 45 for easier and safer management of the warm-up grill 45.

In one embodiment, the present invention further comprises a grill vent 47 and a thermometer 46. The grill vent 47 allows the user to regulate the amount of heat and smoke within the housing body 1, thus altering the cooking style to the user's preference. In general, the grill vent 47 is externally positioned to the housing body 1 and is laterally integrated into the first lateral sidewall 2. This may be implemented in a variety of means. In one embodiment, the grill vent 47 includes an at least one vent hole and a closing mechanism. The vent hole normally traverses into the first lateral sidewall 2 in order expose the internal space of the housing body 1 to the environment. The closing mechanism is integrated into the housing body 1, about the vent hole, and regulates the open level of the vent hole. One particular example of a closing mechanism is a panel with a handle, wherein the panel is slidably mounted to the housing body 1 about the vent hole; and the handle being laterally connected to the panel. Pushing and pulling on the handle slides the panel relative to the vent hole in order to increase or decrease the air flow through the vent hole. The thermometer 46 allows the user to measure the temperature within the housing body 1, directly underneath the first split lid 8 and the second split lid 9. For this, the thermometer 46 is integrated into the first split lid 8; although, the thermometer 46 may also be integrated into the second split lid 9.

Although the invention has been explained in relation to its preferred embodiment, it is to be understood that many other possible modifications and variations can be made without departing from the spirit and scope of the invention as hereinafter claimed.

What is claimed is:

1. A grill with a split lid comprises:
   a housing body;
   a first split lid;
   a second split lid;
   at least one grill tray;
   a charcoal tray;
   a support-structure assembly;
   the housing body comprises a first lateral sidewall, a second lateral sidewall, and a main opening;
   the first lateral sidewall and the second lateral sidewall being mounted parallel and offset to each other, across the main opening;
   the first split lid and the second split lid being positioned opposite to each other across the main opening;
   the first split lid being laterally and hingedly connected to the first lateral sidewall;
   the second split lid being laterally and hingedly connected to the second lateral sidewall;
   the support-structure assembly being positioned adjacent to the housing body, opposite to the main opening;
   the support-structure assembly being adjacently mounted to the housing body;
   the charcoal tray being positioned adjacent to the support-structure assembly;
   the grill tray being positioned adjacent to the charcoal tray, opposite to the support-structure assembly;
   the charcoal tray and the grill tray each being laterally and slidably mounted into the housing body;
   a charcoal-receiving hole;
   the charcoal tray comprises a charcoal box frame, a charcoal grate, and a second handle;
   the charcoal-receiving hole normally traversing through the front sidewall;
   the charcoal box frame being positioned within the charcoal-receiving hole;
   the charcoal box frame being slidably mounted to the housing body within the charcoal-receiving hole;
   the charcoal grate being perimetrically mounted within the charcoal box frame;
   the second handle being externally positioned to the housing body;
   the second handle being externally and adjacently mounted to the charcoal box frame;
   at least one first asymmetric gear;
   at least one second asymmetric gear;
   a first rack-and-pinion mechanism;
   a second rack-and-pinion mechanism;
   the first asymmetric gear and the second asymmetric gear being positioned opposite to each other, across the charcoal box frame;
   the first asymmetric gear and the second asymmetric gear being positioned within the charcoal box frame;
   the first asymmetric gear being rotatably mounted to a third lateral sidewall of the charcoal box frame;
   the second asymmetric gear being rotatably mounted to a fourth lateral sidewall of the charcoal box frame;
   the first rack-and-pinion mechanism being mechanically integrated in between the charcoal box frame and the first asymmetric gear;
   the second rack-and-pinion mechanism being mechanically integrated in between the charcoal box frame and the second asymmetric gear;
   a spur gear of the first rack-and-pinion mechanism being concentrically and torsionally connected to the first asymmetric gear;
   a toothed bar of the first rack-and-pinion mechanism normally traversing through a frontal sidewall of the charcoal box frame and being mechanically engaged to the spur gear of the first rack-and-pinion mechanism;
   a spur gear of the second rack-and-pinion mechanism being concentrically and torsionally connected to the second asymmetric gear;
   a toothed bar of the second rack-and-pinion mechanism normally traversing through the frontal sidewall and being mechanically engaged to the spur gear of the second rack-and-pinion mechanism;
   the adjustment handle being perpendicularly and terminally connected in between the toothed bar of the first rack-and-pinion mechanism and the toothed bar of the second rack-and-pinion mechanism; and the charcoal grate being positioned adjacent and onto the first asymmetric gear and the second asymmetric gear.

2. The grill with a split lid as claimed in claim 1 comprises:
a first lateral shelf;
the first lateral shelf being positioned adjacent to the first lateral sidewall, opposite the main opening; and
the first lateral shelf being mounted perpendicular to the first lateral sidewall.

3. The grill with a split lid as claimed in claim 1 comprises:
a second lateral shelf;
the second lateral shelf being positioned adjacent to the second lateral sidewall, opposite the main opening; and
the second lateral shelf being mounted perpendicular to the second lateral sidewall.

4. The grill with a split lid as claimed in claim 1 comprises:
a main shelf;
the housing body comprises a front sidewall;
the front sidewall being perpendicularly connected in between the first lateral sidewall and the second lateral sidewall;
the main shelf being positioned in between the support-structure assembly and the charcoal tray; and
the main shelf being laterally and perpendicularly mounted to the front sidewall.

5. The grill with a split lid as claimed in claim 1 comprises:
a first lid handle;
a first viewing window;
the first lid handle being positioned adjacent to the first split lid, opposite the housing body;
the first lid handle being externally and adjacently connected to the first split lid; and
the first viewing window being integrated into the first split lid, adjacent to the first lid handle.

6. The grill with a split lid as claimed in claim 1 comprises:
a second lid handle;
a second viewing window;
the second lid handle being positioned adjacent to the second split lid, opposite the housing body;
the second lid handle being externally and adjacently connected to the second split lid; and
the second viewing window being integrated into the first split lid, adjacent to the second lid handle.

7. The grill with a split lid as claimed in claim 1 comprises:
the first split lid being terminally and hingedly mounted to the first lateral sidewall about a first rotation axis;
the second split lid being terminally and hingedly mounted to the second lateral sidewall about a second rotation axis;
the first rotation axis and the second rotation axis being positioned parallel and offset to each other about the main opening; and
the first split lid and the second split lid being oriented towards each other.

8. The grill with a split lid as claimed in claim 1 comprises:
a grill-receiving hole;
the housing body comprises a front sidewall;
the grill tray comprises a grill box frame, a grill grate, and a first handle;
the front sidewall being perpendicularly connected in between the first lateral sidewall and the second lateral sidewall;
the grill-receiving hole normally traversing through the front sidewall;
the grill box frame being positioned within the grill-receiving hole;
the grill box frame being slidably mounted to the housing body within the grill-receiving hole;
the grill grate being perimetrically mounted within the grill box frame;
the first handle being externally positioned to the housing body; and
the first handle being externally and adjacently mounted to the grill box frame.

9. The grill with a split lid as claimed in claim 1 comprises:
an exhaust chimney;
the housing body comprises a rear sidewall;
the rear sidewall being perpendicularly connected in between the first lateral sidewall and the second lateral sidewall; and
the exhaust chimney laterally traversing into the rear sidewall.

10. The grill with a split lid as claimed in claim 1 comprises:
the housing body comprises a bottom sidewall;
the support-structure assembly comprises a plurality of legs, an at least one pair of wheels;
the bottom sidewall being perpendicularly connected in between the first lateral sidewall and the second lateral sidewall;
the plurality of legs being distributed about the bottom sidewall;
each of the plurality of legs being hingedly and terminally connected to the bottom sidewall;
the pair of wheels being positioned adjacent to the plurality of legs, opposite the housing body;
a first wheel from the pair of wheels being rotatably mounted to a first leg from the plurality of legs;
a second wheel from the pair of wheels being rotatably mounted to a second leg from the plurality of legs; and
the first wheel and the second wheel being coaxially positioned with each other.

11. The grill with a split lid as claimed in claim 1 comprises:
a warm-up grill;
the warm-up grill being perimetrically positioned within the main opening; and
the warm-up grill being slidably mounted to the housing body.

12. The grill with a split lid as claimed in claim 1 comprises:
a thermometer; and
the thermometer being integrated into the first split lid.

13. The grill with a split lid as claimed in claim 1 comprises:
a grill vent;
the grill vent being externally positioned to the housing body; and
the grill vent being laterally integrated into the first lateral sidewall.

* * * * *